(12) United States Patent
Yamamoto et al.

(10) Patent No.: US 8,125,638 B2
(45) Date of Patent: Feb. 28, 2012

(54) SPECTROSCOPE

(75) Inventors: Toshikazu Yamamoto, Musashino (JP);
Tsutomu Kaneko, Musashino (JP);
Manabu Kojima, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 324 days.

(21) Appl. No.: 12/426,366

(22) Filed: Apr. 20, 2009

(65) Prior Publication Data
US 2009/0262347 A1 Oct. 22, 2009

(30) Foreign Application Priority Data

Apr. 18, 2008 (JP) .................................. 2008-109044

(51) Int. Cl.
*G01J 3/28* (2006.01)

(52) U.S. Cl. ...................................................... 356/328

(58) Field of Classification Search ................... 356/328
See application file for complete search history.

(56) References Cited

U.S. PATENT DOCUMENTS
4,709,989 A * 12/1987 Machler ........................ 359/896
7,180,590 B2 * 2/2007 Bastue et al. ................. 356/326

FOREIGN PATENT DOCUMENTS
JP 2-231536 A 9/1990
JP 2000-337962 A 12/2000

* cited by examiner

*Primary Examiner* — Gregory J Toatley
*Assistant Examiner* — Abdullahi Nur
(74) *Attorney, Agent, or Firm* — Sughrue Mion, PLLC

(57) ABSTRACT

An improvement is added to a spectroscope for performing wavelength dispersion of measured light with a wavelength dispersion element and receiving the light at a light reception element. The spectroscope has a first compound lens made up of a plurality of lenses for converting measured light into parallel light and emitting the parallel light to the wavelength dispersion element; a second compound lens made up of a plurality of lenses for gathering the measured light subjected to the wavelength dispersion in the wavelength dispersion element and causing the light reception element to receive the light; and a base for fixing the wavelength dispersion element, the first compound lens, and the second compound lens. The linear expansion coefficient of the compound focal length of the first compound lens, the linear expansion coefficient of the compound focal length of the second compound lens, and the linear expansion coefficient of a material forming the base are substantially equal.

13 Claims, 4 Drawing Sheets

| LENS<br>PARAMETER | A1 (A1') | | A2 (A2') | |
|---|---|---|---|---|
| CURVATURE RADIUS [mm] | $r_{1a}$ | $r_{1b}$ | $r_{2a}$ | $R_{2b}$ |
| | −247 | +52 | +50 | −50 |
| GLASS MATERIAL | SF4 | | SK11 | |
| REFRACTIVE INDEX | 1.762 | | 1.566 | |
| LINEAR EXPANSION COEFFICIENT [/°C] | $8.0 \times 10^{-6}$ | | $6.5 \times 10^{-6}$ | |
| TEMPERATURE CHANGE DEPENDENCY OF REFRACTIVE INDEX | 7.7 | | 1.8 | |

SPECTROSCOPE

TECHNICAL FIELD

The present disclosure relates to a spectroscope for performing wavelength dispersion of measured light with a wavelength dispersion element and receiving the light at a light reception element and more particularly to a spectroscope for keeping good wavelength resolution against change in the environment temperature without using a special material for a base for fixing optical components.

RELATED ART

A spectroscope performs wavelength dispersion of measured light with a wavelength dispersion element (for example, a diffraction grating) and measures light power for each wavelength with a light reception element. The spectroscope converts the measured light incident on the spectroscope into parallel light using collimating means (for example, a concave mirror), emits the parallel light to a diffraction grating, gathers diffracted light from the diffraction grating using light gathering means (for example, a concave mirror), and receives the light at the light reception element with the wavelength band limited through an output slit.

At this time, there is a problem in that when the ambient temperature changes, the concave mirror expands or shrinks, whereby the focal length fluctuates and the wavelength resolution of the spectroscope worsens.

Then, this problem is corrected by making almost equal the linear expansion coefficient of the material of the concave mirror and that of the material of the base. (For example, refer to patent documents 1 and 2.)

FIG. 5 is a drawing to show the configuration of a spectroscope in a related art (Czerny—Turner monochromator) (for example, refer to patent document 1). In FIG. 5, an incidence slit 1 limits the width of measured light incident on the spectroscope. A concave mirror 2 converts the measured light passing through the incidence slit 1 into parallel light. A diffraction grating 3 of a wavelength dispersion element performs wavelength dispersion of the measured light converted into parallel light on the concave mirror 2 and emits the light at a different angle for each wavelength. A concave mirror 4 gathers the measured light subjected to the wavelength dispersion in the diffraction grating 3. An output slit 5 is provided at a position where the measured light is gathered by the concave mirror 4 and allows only the measured light of a predetermined wavelength to pass through for limiting the wavelength band. A light reception element 6 receives only the measured light passing through the output slit 5 and outputs an electric signal responsive to light power of the received light. The diffraction grating 3 is rotated for performing wavelength sweep of the measured light, whereby spectrum measurement of the measured light can be performed with the horizontal axis as the wavelength and the vertical axis as the light power.

The optical components (incidence slit 1, concave mirrors 2 and 4, diffraction grating 3, and output slit 5) are fixed onto a base 7.

If the focal length of each of the concave mirrors 2 and 4 is set to 280 [mm] and the material is soda glass in FIG. 5, the linear expansion coefficient per unit length [m] relative to the focal length becomes equal to the linear expansion coefficient of the soda glass of the concave mirror 2, 4 and is $9 \times 10^{-6}$ [/° C.]. On the other hand, if the base 7 is made of a special material with ceramic mixed into aluminum, the linear expansion coefficient per unit length is $15 \times 10^{-6}$ [/° C.] and the linear expansion coefficient of the material of the concave mirror 2, 4 and that of the material of the base 7 become almost equal.

In FIG. 5, for example, a distance L1 between the incidence slit 1 and the concave mirror 2 and a distance L2 between the concave mirror 4 and the output slit 5 are each 280 [mm]. In this cases the temperature coefficient of the distance L1, L2 becomes 4.2 [μm/° C.] ($=15 \times 10^{-6}$ [/° C.]×280 [mm]). On the other hand, the temperature coefficient of the focal length of the concave mirror 2, 4 becomes 2.5 [μm/° C.] ($=9 \times 10^{-6}$ [/° C.]×280 [mm]). Therefore, the temperature coefficient difference between them is 1.7 [μm/° C.] (=4.2 [μm/° C.]−2.5 [μm/° C.]).

If the ambient temperature of the spectroscope rises 10 [° C.] from the temperature at the assembling time of the spectroscope, the measured light collected by the concave mirror 4 comes into a focus before about 34 [μm] (=|(4.2 [μm/° C.]−2.5 [μm/° C.])×2×10 [° C.]| from the face top of the output slit 5 because of the temperature coefficient difference between them mentioned above. The width of the measured light formed on the output slit 5 widens to 6.8 [μm] (=34 [μm]×2×0.1) if the numerical aperture of the concave mirror 2, 4 is 0.1. If the minimum width of the output slit 5 is 15 [μm], the spread width of the measured light is sufficiently small as compared with the minimum width and thus the wavelength resolution is not degraded.

On the other hand, the change amount of the ambient temperature relative to the temperature at the assembling time of the spectroscope at which the width of the measured light formed on the output slit 5 becomes 15 [μm] is ±22.0 [° C.] and the temperature range in which the spectroscope shown in FIG. 5 can be used has a width of the reference temperature at the assembling time ±22.0 [° C.] and sufficient wavelength resolution can be shown in a usual work environment.

The width of light formed on the output slit 5 needs to be equal to or less than the slit width of the output slit 5 and the relationship among linear expansion coefficient K1 of the base 7, linear expansion coefficient of the focal length of the concave mirror 2, 4 (namely, the linear expansion coefficient of the material) K2, slit width d of the output slit 5, focal length L of the concave mirror 2, 4 at the assembling time of the spectroscope, and change temperature ΔT of the ambient temperature relative to the temperature at the assembling time of the spectroscope is represented by the following expression:

$$|K1-K2| \leq |d/(4aL\Delta T)|$$

Practically, the difference between the linear expansion coefficients K1 and K2 is set to $10 \times 10^{-6}$ [/° C.] or less, whereby the wavelength resolution can be kept good if the ambient temperature changes.

[Patent document 1] Japanese Patent Laid-Open No. 2000-337962

[Patent document 2] Japanese Patent Laid-Open No. 231536/1990

Thus, the difference between the linear expansion coefficient of the material of the concave mirror 2, 4 and that of the material of the base 7 is set to $10 \times 10^{-6}$ [/° C.] or less for maintaining the wavelength resolution.

However, to use soda glass as the material of the concave mirror 2, 4, there is a problem in that a special material with ceramic mixed into aluminum must be used as the material of the base 7 to match the linear expansion coefficients of the concave mirror 2, 4 and the base 7 with each other.

SUMMARY

Exemplary embodiments of the present invention provide a spectroscope for keeping good wavelength resolution against change in the environment temperature without using a special material for a base for fixing optical components.

According to a first aspect of the invention, there is provided a spectroscope comprising:

a wavelength dispersion element which performs wavelength dispersion of measured light with;

a light reception element which receives the light;

a first compound lens which converts the incident measured light into parallel light and emits the parallel light to the wavelength dispersion element, the first compound lens including a plurality of lenses;

a second compound lens which gathers the measured light subjected to the wavelength dispersion in the wavelength dispersion element and causes the light reception element to receive the light, the second compound lens including a plurality of lenses; and a base which fixes the wavelength dispersion element, the first compound lens, and the second compound lens, wherein the linear expansion coefficient of the compound focal length of said first compound lens, the linear expansion coefficient of the compound focal length of said second compound lens, and the linear expansion coefficient of a material forming said base are substantially equal.

The invention according to a second aspect is characterized by the fact that in invention of the first aspect, for the first compound lens and the second compound lens, the linear expansion coefficient of the compound focal length of the compound lens is adjusted according to at least one of the curvature radius of each of the plurality of lenses, the refractive index of a lens material of each of the plurality of lenses, the temperature change ratio of the refractive index of the lens material, or the linear expansion coefficient of the lens material.

The invention according to a third aspect is characterized by the fact that a spectroscope comprises:

a wavelength dispersion element which performs wavelength dispersion of measured light with;

a light reception element which receives the light;

a compound lens including a plurality of lenses, which converts the incident measured light into parallel light and emits the parallel light to the wavelength dispersion element, and which gathers the measured light subjected to the wavelength dispersion in the wavelength dispersion element and causes the light reception element to receive the light; and a base which fixes the wavelength dispersion element and the compound lens, wherein the linear expansion coefficient of the compound focal length of the compound lens, and the linear expansion coefficient of a material forming the base are substantially equal.

The invention according to a fourth aspect is characterized by the fact that in the invention according to the first aspect, the spectroscope further includes a wavelength band limiting member being provided at the focal position of the second compound lens, which limits the wavelength band of diffracted light from the wavelength dispersion element.

The invention according to a fifth aspect is characterized by the fact that in the invention of the first aspect, the light reception element has a plurality of photodiodes arranged in a wavelength dispersion direction with a light reception face provided at the focal position of the second compound lens.

According to the invention, the following advantages are provided:

A plurality of lenses are combined, whereby the linear expansion coefficient of the compound focal length of the compound lens can be adjusted and can be made substantially equal to the linear expansion coefficient of the material of the base. Accordingly, selectivity of materials used for the lenses and the base is enhanced and the need for using a special material for the base is also eliminated.

Other features and advantages may be apparent from the following detailed description, the accompanying drawings and the claims.

DETAILED DESCRIPTION

A spectroscope of an embodiment of the invention will be discussed with the accompanying drawings.

Figure 1:
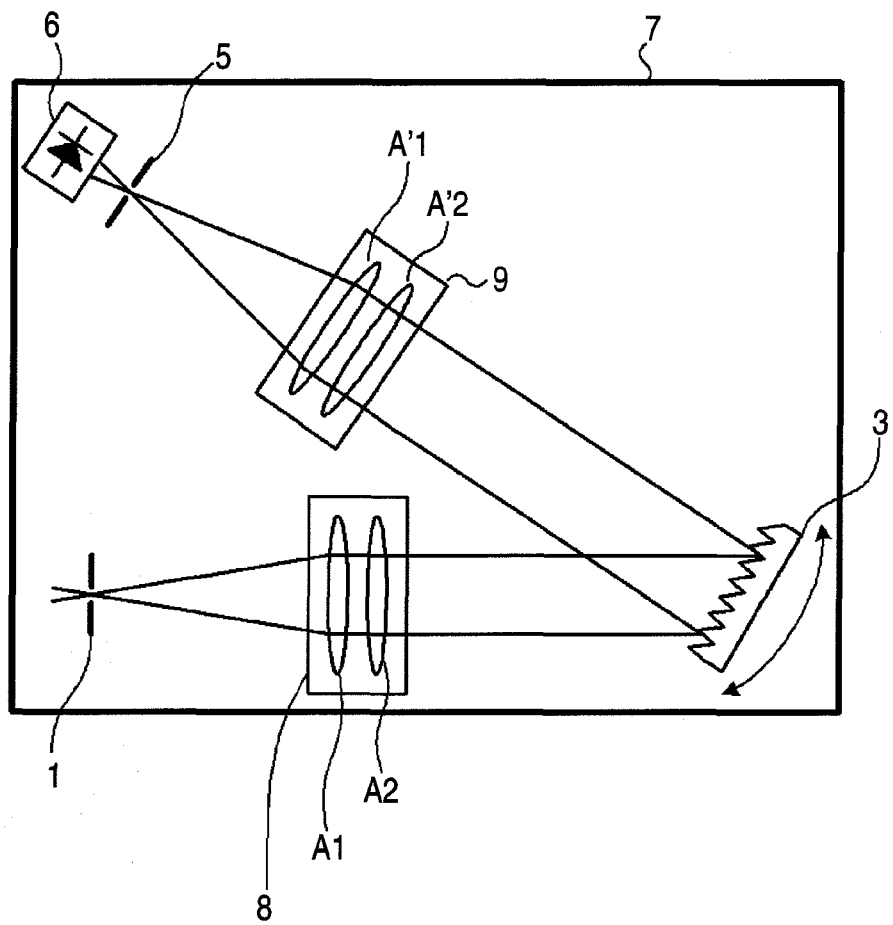
FIG. 1 is a configuration drawing to show one embodiment of the invention.

FIG. 1 is a configuration drawing to show one embodiment of the invention. Components identical with those previously described with reference to FIG. 5 are denoted by the same reference numerals in FIG. 1 and will not be discussed again.

Figure 5:
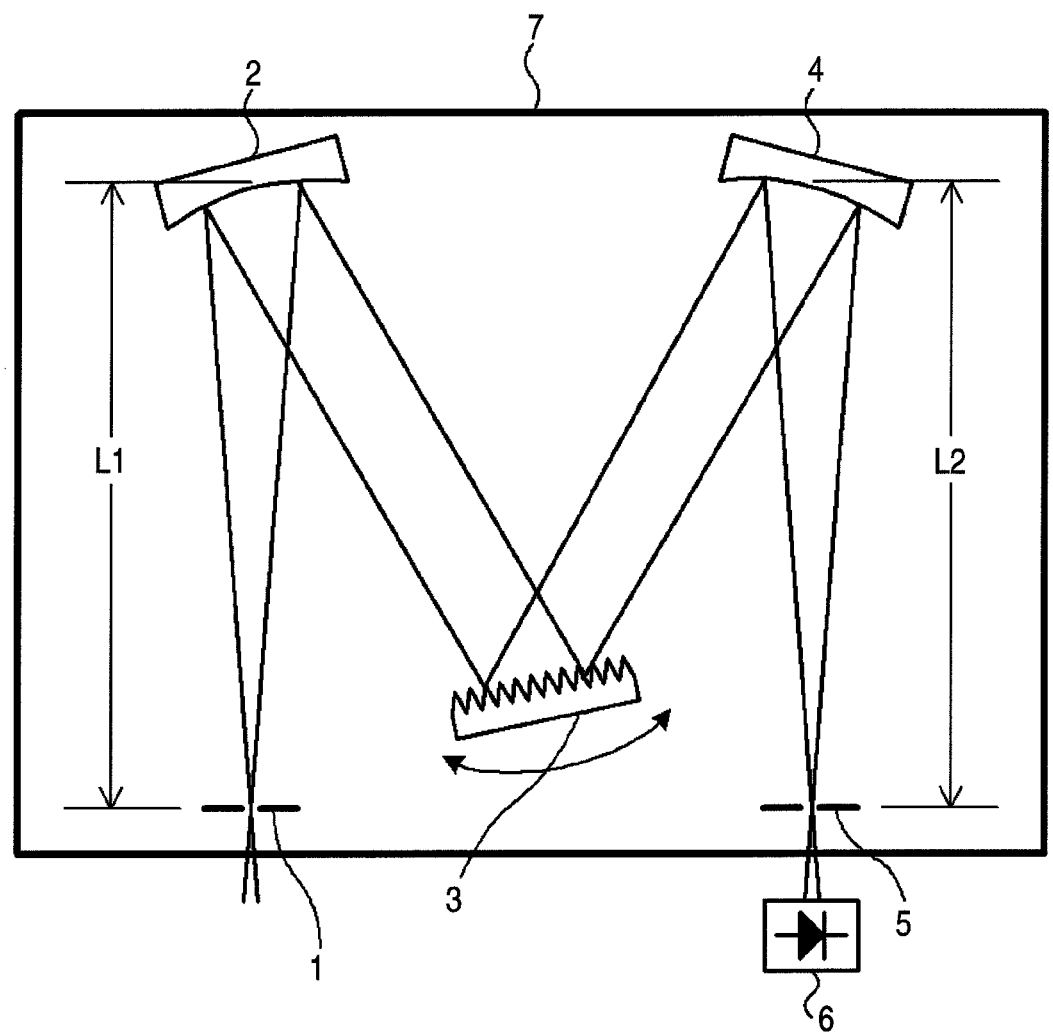
FIG. 5 is a drawing to show the configuration of a spectroscope in a related art.

In FIG. 1, a first compound lens 8 of collimating means is provided between an incidence slit 1 and a diffraction grating 3 in place of the concave mirror 2 in FIG. 5. The first compound lens 8 is made up of two lenses A1 and A2 for converting measured light passing through the incidence slit 1 into parallel light and emitting the parallel light to the diffraction grating 3. The lens A1 is provided on the side of the incidence slit 1 and the lens A2 is provided on the side of the diffraction grating 3.

A second compound lens 9 of light gathering means is provided between the diffraction grating 3 and an output slit 5 in place of the concave mirror 4 in FIG. 5. The second compound lens 9 is made up of two lenses A'1 and A'2 for gathering measured light diffracted for each wavelength in the diffraction grating 3 onto the face of the output slit 5. The lens A'1 is provided on the side of the output slit 5 and the lens A'2 is provided on the side of the diffraction grating 3.

FIG. 1 shows the configuration wherein a light reception element 6 (a single photodiode) is provided on a base 7, but may be fixed to a member different from the base 7 as in FIG. 5.

The operation is as follows:

The first compound lens 8 converts measured light passing through the incidence slit 1 into parallel light and emits the parallel light to the diffraction grating 3. The diffraction grating 3 separates the measured light spatially at different angles for each wavelength for output.

Further, the second compound lens 9 gathers the diffracted measured light onto the face of the output slit 5. The output slit 5 allows only the measured light of a predetermined wavelength to pass through for limiting the wavelength band. Further, the light reception element 6 receives only the measured light passing through the output slit 5 and outputs an electric signal responsive to light power of the received light. The diffraction grating 3 is rotated for performing wavelength sweep of the measured light, whereby spectrum measurement of the measured light can be performed with the horizontal axis as the wavelength and the vertical axis as the light power.

Figure 2:
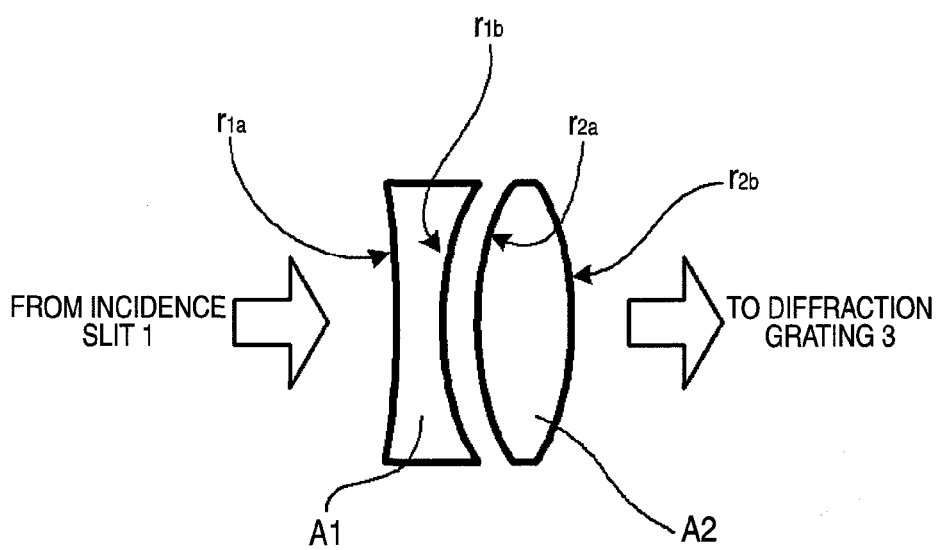
FIG. 2 is a drawing to show a compound lens 8 of the device shown in FIG. 1.

Next, the compound lenses 8 and 9 will be discussed in detail. FIG. 2 is a drawing to show the first compound lens 8 of the device shown in FIG. 1.

The first compound lens 8 is made up of the lenses A1 and A2 as described above. The lens A1 has two spherical surfaces and has a curvature radius of $r_{1a}$ on the incidence side (incidence slit 1 side) and a curvature radius of $r_{1b}$ on the output side (lens A2 side).

Likewise, the lens A2 has two spherical surfaces and has a curvature radius of $r_{2a}$ on the incidence side (lens A side) and a curvature radius of $r_{2b}$ on the output side (diffraction grating 3 side).

The refractive index of the material of the lens A1 (glass material) is $n_1$ and the refractive index of the material of the lens A2 (glass material) is $n_2$.

A focal length $f_1$ of the lens A1 and a focal length $f_2$ of the lens A2 establish the relationship in the following expression (1) wherein i corresponds to the lens A1, A2 (i=1, 2):

$$\frac{1}{f_i} = (n_i - 1) * \left(\frac{1}{r_{ia}} - \frac{1}{r_{ib}}\right) \qquad \text{[Expression 1]}$$

Change in the focal length $f_1$, $f_2$ relative to temperature change of the lens A1, A2 is represented by the following expression (2) by differentiating both sides of expression (1) with respect to temperature T:

$$-\frac{1}{f_i^2} \cdot \frac{df_i}{dT} = \frac{dn_i}{dT} \cdot \left(\frac{1}{r_{ia}} - \frac{1}{r_{ib}}\right) + (n_i - 1) \cdot \begin{pmatrix} -\frac{1}{r_{ia}^2} \cdot \frac{dr_{ia}}{dT} + \\ \frac{1}{r_{ib}^2} \cdot \frac{dr_{ib}}{dT} \end{pmatrix} \qquad \text{[Expression 2]}$$

Therefore, letting the linear expansion coefficient of the material of the lens A1 be $\alpha_1$ and the linear expansion coefficient of the material of the lens A2 be $\alpha_2$, the relation in the following expression (3) can be shown:

$$\frac{dr_{ia}}{dT} = \alpha_i \cdot r_{ia} \qquad \text{[Expression 3]}$$

$$\frac{dr_{ib}}{dT} = \alpha_i \cdot r_{ib}$$

According to expressions (2) and (3), the temperature characteristic of the focal length $f_1$ of the lens A1 and the focal length $f_2$ of the lens A2 is shown as the following expression (4):

$$\begin{aligned}\frac{df_i}{dT} &= -f_i^2 \frac{dn_i}{dT} \cdot \left(\frac{1}{r_{ia}} - \frac{1}{r_{ib}}\right) + f_i^2 (n_i - 1) \cdot \\ &\quad \left(\frac{1}{r_{ia}^2} \cdot \frac{dr_{ia}}{dT} - \frac{1}{r_{ib}^2} \cdot \frac{dr_{ib}}{dT}\right) \\ &= -f_i^2 \frac{dn_i}{dT} \cdot \left(\frac{1}{r_{ia}} - \frac{1}{r_{ib}}\right) + f_i^2 (n_i - 1) \cdot \\ &\quad \left(\frac{1}{r_{ia}^2} \cdot (\alpha_i \cdot r_{ia}) - \frac{1}{r_{ib}^2} \cdot (\alpha_i \cdot r_{ib})\right) \\ &= f_i^2 \left[\alpha_i \cdot (n_i - 1) - \frac{dn_i}{dT}\right] \cdot \left(\frac{1}{r_{ia}} - \frac{1}{r_{ib}}\right) \end{aligned} \qquad \text{[Expression 4]}$$

On the other hand, the focal length f of the compound lens 8 is the compound focal length of the lenses A1 and A2 and therefore the following relational expression of expression (5) holds.

$$\frac{1}{f} = \sum_{i=1}^{2} \frac{1}{f_i} \qquad \text{[Expression 5]}$$

$$= \frac{1}{f_i} + \frac{1}{f_2}$$

From expressions (4) and (5), the temperature characteristic of the focal length f of the compound lens 8 becomes expression (6) wherein $f_s$ is the compound focal length of the compound lens 8 at the reference temperature at the assembling time of the spectroscope.

$$\begin{aligned}\frac{df}{dT} &= f_s^2 \cdot \sum_{i=1}^{2} \frac{1}{f_i^2} \cdot \frac{df_i}{dT} \\ &= f_s^2 \cdot \sum_{i=1}^{2} \left[\alpha_i \cdot (n_i - 1) - \frac{dn_i}{dT}\right] \cdot \left(\frac{1}{r_{ia}} - \frac{1}{r_{ib}}\right) \end{aligned} \qquad \text{[Expression 6]}$$

On the other hand, spacing LA between the incidence slit 1 and the first compound lens 8 is adjusted so as to become the compound focal length f at the assembling time of the spectroscope. Therefore, change amount dLA/dT of the spacing LA between the incidence slit 1 and the first compound lens 8 relative to temperature change becomes the following expression (7):

$$\frac{dLA}{dT} = \alpha_{Bass} \cdot f_s \qquad \text{[Expression 7]}$$

where $\alpha_{BASE}$ is the linear expansion coefficient of the base 7 and the focal length $f_s$ is the compound focal length of the compound lens 8 at the reference temperature at the assembling time of the spectroscope.

Thus, if change amount df/dT of the compound focal length f in expression (6) relative to temperature change and the change amount dLA/dT of the spacing LA (the distance between the incidence slit 1 and the first compound lens 8) relative to temperature change in expression (7) equal, the compound lens 8 converts measured light from the incidence slit 1 into parallel light and emits the parallel light to the diffraction grating 3 without being affected by change in the ambient temperature.

Likewise, the relations in expressions (1) to (7) also hold for the second compound lens 9. Therefore, if the change amount of the compound focal length of the second compound lens 9 relative to temperature change and the change amount of spacing LA' (spacing between the second compound lens 9 and the output slit 5) relative to temperature change equal, the second compound lens 9 gathers the diffracted light from the diffraction grating 3 onto the face of the output slit 5 as the light comes into a focus without being affected by change in the ambient temperature.

That is, the linear expansion coefficient of the compound focal length of the first compound lens 8, the linear expansion coefficient of the compound focal length of the second compound lens 9, and the linear expansion coefficient of the material forming the base 7 to which the optical components (the incidence slit 1, the diffraction grating 3, the output slit 5, and the first and second compound lenses 9) are fixed are matched with each other and are made equal. Accordingly, the first compound lens 8 emits parallel light to the diffraction grating 3 and the second compound lens 9 gathers the diffracted light onto the output slit 5 regardless of how the ambient temperature at the operating time changes relative to the reference temperature at the assembling time. Therefore, the wavelength resolution can be kept good against change in the environment temperature without using a special material for the base for fixing the optical components.

Figure 3:
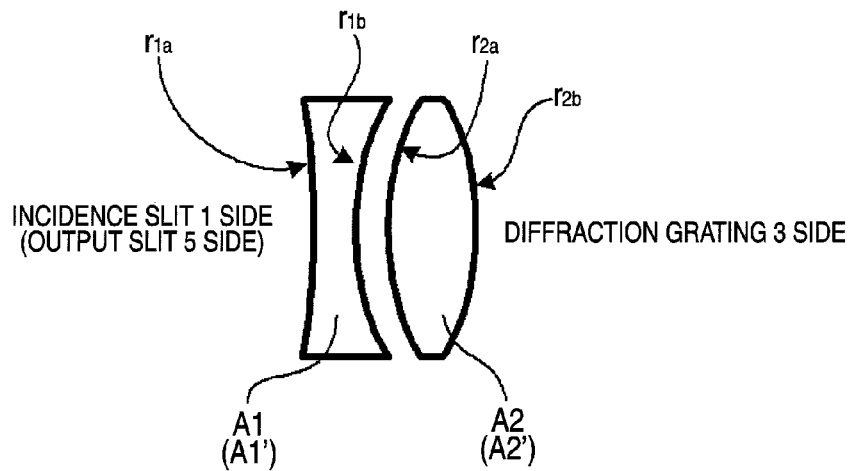
FIG. 3 is a drawing to show the specific configuration of the compound lens 8, 9 of the device shown in FIG. 1.

A specific description is as follows: FIG. 3 is a drawing to show an example of the first compound lens 8, the second compound lens 9. In a specific example given below, the first compound lens 8 will be mainly discussed.

It is assumed that aluminum different largely in linear expansion coefficient from a glass material although it is inexpensive is used as the material of the base 7. If the glass materials used as the lenses A1 and A2 of the first compound lens 8 are determined, the refractive indexes $n_1$ and $n_2$, the linear expansion coefficients $\alpha_1$ and $\alpha_2$, and temperature change dependency of refractive index $dn_1/dT$ and $dn_2/dT$ of the glass materials are known values.

Therefore, combination of the materials and the curvature radiuses of the lens A1 and A2 satisfying expressions (6) and (7) may be appropriately selected and determined considering the assembly of the spectroscope, the workability of the lens A1 and A2, the cost, etc.

A specific embodiment will be discussed using the numeric values.

As described above, if aluminum is used as the material of the base 7, the linear expansion coefficient of aluminum as the base of the optical components, $\alpha_{BASE}=23.1\times10^{-6}$ [/° C.].

On the other hand, the first compound lens 8 and the second compound lens 9 are of the same composition. The first compound lens 8 and the second compound lens 9 are as follows:
Lens A1 (A1')
  Curvature radius: $r_{1a}=-247$ [mm], $r_{1b}=+52$ [mm]
  Glass material: SF4
  (refractive index: $n_1=1.762$,
  linear expansion coefficient: $\alpha_1=8.0\times10^{-6}$ [/° C.]
  temperature change dependency of refractive index: $dn_1/dT=7.7$)
Lens A2 (A2')
  Curvature radius: $r_{2a}+50$ [mm], $r_{2b}=-50$ [mm]
  Glass material; SK11
  (refractive index: $n_2=1.566$,
  linear expansion coefficient: $\alpha_2=6.5\times10^{-6}$ [/° C.]
  temperature change dependency of refractive index: $dn_2/dT=1.8$)

If the condition is assigned to expression (6), the compound focal length of the compound lens 8 at the reference temperature, $f_s=204$ [mm] and the change amount of the compound focal length f relative to temperature change, $df/dT=0.0047\times10^{-3}$ [mm/° C.].

From expression (7), the temperature dependency of the spacing LA between the incidence slit 1 and the compound lens 8 (the linear expansion coefficient of aluminum, $\alpha_{BASE}=23.1\times10^{-3}$ [mm/° C.] and the compound focal length at the reference temperature, $f_s=204$ [mm]), $dLA/dT=0.0047\times10^{-3}$ [mm/° C.].

Thus, the lenses A1 and A2 are combined and the linear expansion coefficient of the compound focal length of the compound lens is adjusted. Specifically, at least any one of the curvature radius of each lens, the refractive index of the lens material, the temperature change ratio of the refractive index, or the linear expansion coefficient of the lens material is appropriately adjusted and selected. The linear expansion coefficient of the compound focal length of the first compound lens 8, the linear expansion coefficient of the compound focal length of the second compound lens 9, and the linear expansion coefficient of the material forming the base 7 are matched with each other. Thus, if the base 7 fixing the optical components is made of inexpensive material (aluminum), the wavelength resolution of the spectroscope can be kept good against change in the environment temperature.

The invention is not limited to the embodiment described above and may be as shown below:

(1) Each of the first compound lens 8 and the second compound lens 9 is made up of the two lenses A1 and A2 (A'1 and A'2) in combination, but may be made up of three or more lenses in combination. Three or more lenses are thus combined, whereby the flexibility of material selection increases and the flexibility of design is also enhanced. The following (8) may be used in place of expression (6):

$$\frac{df}{dT} = f_s^2 \cdot \sum_{i=1}^{k}\left[\alpha_i \cdot (n_i - 1) - \frac{dn_i}{dT}\right] \cdot \left(\frac{1}{r_{ia}} - \frac{1}{r_{ib}}\right) \quad \text{[Expression 8]}$$

where i=1, 2, 3 . . . , k (k: number of component lenses)

The change amounts relative to the temperatures in expressions (7) and (8) are made equal, whereby a spectroscope capable of keeping good wavelength resolution if the environment temperature changes can be realized.

(2) The lenses A1, A2, A'1, and A'2 of the first compound lens 8 and the second compound lens 9 are spherical lenses, but aspherical lenses may be used.

(3) Aluminum is used as the material of the base 7, but any desired material may be used. Any desired material may be used as the compound lens 3, 9. Further, the lenses A1 and A2 are made of different materials, but may be made of the same material.

(4) The compound lenses 8 and 9 are of the same composition, but may be of different compositions (different curvature radius, material).

(5) The configuration applied to a monochromator is shown, but may be applied to a combination of diffraction gratings of double monochromator, etc.

(6) The configuration used for the single-path spectroscope is shown, but may be applied to various modified spectroscopes such as a multipath spectroscope of double paths or more, etc.

Figure 4:
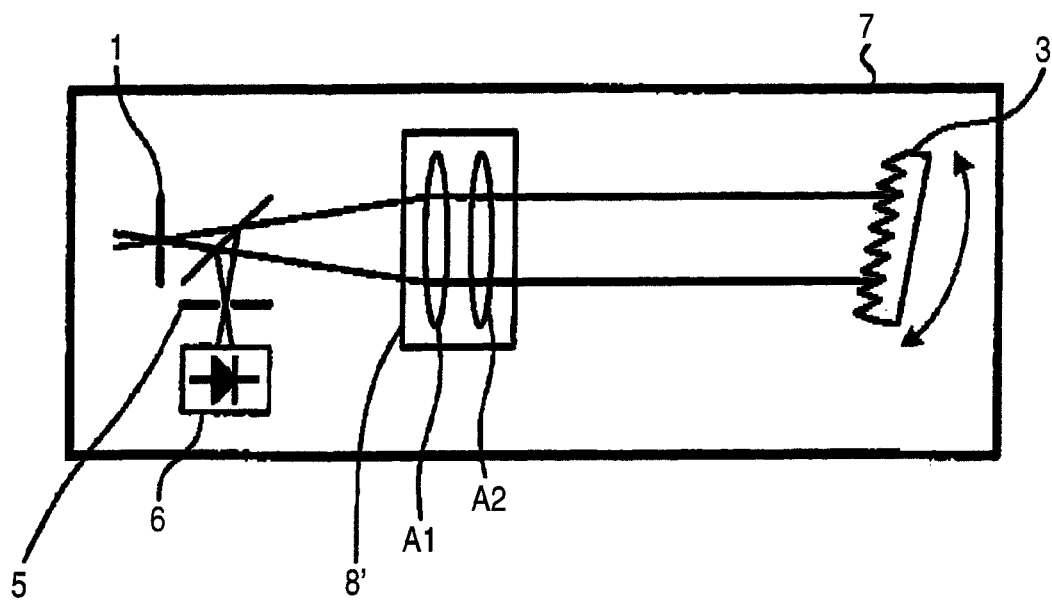
FIG. 4 is a configuration drawing to show a modified example of one embodiment of the invention.

(7) The invention may be applied to a Littrow spectroscope using a compound lens 8' which performs both functions of the first compound lens 8 and the second compound lens 9 integrally formed (FIG. 4).

(8) An optical fiber may be used in place of the incidence slit 1 and the output slit (wavelength band limiting member) 5.

(9) The configuration wherein a photodiode is used for the spectroscope of single monochromator is shown, but may be applied to a spectroscope of polymonochromator type. In this case, a photodiode array made up of photodiodes is used as the light reception element. Dot-like or strip photodiodes are arranged in the wavelength dispersion direction and the photodiode width (wavelength dispersion direction) has the function of the output slit 5 (wavelength band limiting).

(10) The linear expansion coefficients of the focal lengths f of the compound lenses 8 and 9 and the linear expansion coefficient of the base 7 are made equal, but may be almost equal. That is, the linear expansion coefficients of the focal lengths f of the compound lenses 8 and 9 and the linear expansion coefficient of the base 7 are made substantially equal. Considering the temperature range in the operating environment, the width of the output slit 5, etc., no practical problem may occur if the linear expansion coefficients are not completely matched with each other. For example, the difference between the linear expansion coefficient of the focal length f of the compound lens 8, 9 and that of the base 7 may be $10 \times 10^{-6}$ [/° C.] or less.

(11) The spectroscope shown in FIG. 1 may be used for an optical spectrum analyzer, a wavelength differentiating section of a wavelength monitor, etc.

What is clamed is:

1. A spectroscope comprising:
   a wavelength dispersion element which performs wavelength dispersion of measured light with;
   a light reception element which receives the light;
   a first compound lens which converts the incident measured light into parallel light and emits the parallel light to the wavelength dispersion element, the first compound lens including a plurality of lenses;
   a second compound lens which gathers the measured light subjected to the wavelength dispersion in the wavelength dispersion element and causes the light reception element to receive the light, the second compound lens including a plurality of lenses; and
   a base which fixes the wavelength dispersion element, the first compound lens, and the second compound lens,
   wherein the linear expansion coefficient of the compound focal length of said first compound lens, the linear expansion coefficient of the compound focal length of said second compound lens, and the linear expansion coefficient of a material forming said base are substantially equal.

2. The spectroscope as claimed in claim 1 wherein for said first compound lens and said second compound lens, the linear expansion coefficient of the compound focal length of the compound lens is adjusted according to the curvature radius of each of the plurality of lenses, the refractive index of a lens material of each of the plurality of lenses, the temperature change ratio of the refractive index of the lens material, or the linear expansion coefficient of the lens material.

3. The spectroscope as claimed in claim 1 further comprising:
   a wavelength band limiting member which limits the wavelength band of diffracted light from the wavelength dispersion element, the wavelength band limiting member being provided at the focal position of said second compound lens.

4. The spectroscope as claimed in claim 1 wherein the light reception element has a plurality of photodiodes arranged in a wavelength dispersion direction with a light reception face provided at the focal position of said second compound lens.

5. The spectroscope of claim 1, wherein a focal length of each of the single lenses of the compound lens is:

$$\frac{1}{f_i} = (n_i - 1) \cdot \left( \frac{1}{r_{ia}} - \frac{1}{r_{ib}} \right),$$

a temperature change ratio of the focal length of each of the single lenses is:

$$-\frac{1}{f_i^2} \cdot \frac{df_i}{dT} = \frac{dn_i}{dT} \cdot \left( \frac{1}{r_{ia}} - \frac{1}{r_{ib}} \right) + (n_i - 1) \cdot \left( -\frac{1}{r_{ia}^2} \cdot \frac{dr_{ia}}{dT} + \frac{1}{r_{ib}^2} \cdot \frac{dr_{ib}}{dT} \right),$$

and a relationship in which the temperature change ratio of curvature radii of the front and the back surfaces of each of the single lenses of the compound lens is:

$$\frac{dr_{ia}}{dT} = \alpha_i \cdot r_{ia}$$
$$\frac{dr_{ib}}{dT} = \alpha_i \cdot r_{ib}$$, and a temperature characteristic of the first compound focal length and the second compound focal length is:

$$\frac{df_i}{dT} = -f_i^2 \frac{dn_i}{dT} \cdot \left( \frac{1}{r_{ia}} - \frac{1}{r_{ib}} \right) + f_i^2 (n_i - 1) \cdot \left( \frac{1}{r_{ia}^2} \cdot \frac{dr_{ia}}{dT} - \frac{1}{r_{ib}^2} \cdot \frac{dr_{ib}}{dT} \right)$$

$$= -f_i^2 \frac{dn_i}{dT} \cdot \left( \frac{1}{r_{ia}} - \frac{1}{r_{ib}} \right) + f_i^2 (n_i - 1) \cdot$$

$$\left( \frac{1}{r_{ia}^2} \cdot (\alpha_i \cdot r_{ia}) - \frac{1}{r_{ib}^2} \cdot (\alpha_i \cdot r_{ib}) \right)$$

$$= f_i^2 \left[ \alpha_i \cdot (n_i - 1) - \frac{dn_i}{dT} \right] \cdot \left( \frac{1}{r_{ia}} - \frac{1}{r_{ib}} \right)$$

6. The spectroscope of claim 5, wherein the compound focal length of the compound lens is a sum of the focal length of each of the single lenses of the compound lens:

$$\frac{1}{f} = \sum_{i=1}^{2} \frac{1}{f_i}$$, and
$$= \frac{1}{f_1} + \frac{1}{f_2}$$

the temperature characteristic of the compound focal length, wherein fs represents the compound focal length of the compound lens at a reference temperature, is:

$$\frac{df}{dT} = f_s^2 \cdot \sum_{i=1}^{2} \frac{1}{f_i^2} \cdot \frac{df_i}{dT}$$

$$= f_s^2 \cdot \sum_{i=1}^{2} \left[ \alpha_i \cdot (n_i - 1) - \frac{dn_i}{dT} \right] \cdot \left( \frac{1}{r_{ia}} - \frac{1}{r_{ib}} \right)$$

7. The spectroscope of claim 6, wherein a spacing LA between an incidence slit and the first compound lens is adjusted to the compound focal length at a time of assembly of the spectroscope, and a change amount dLA/dT of the spacing LA between the incidence slit and the first compound lens relative to the temperature change is:

$$\frac{dLA}{dT} = \alpha_{Base} \cdot f_s$$

wherein $\alpha_{BASE}$ is the linear expansion coefficient of the base and the focal length fs is the compound focal length of the compound lens at the reference temperature at the time of the assembly of the spectroscope.

8. The spectroscope of claim 5, wherein the compound focal length of the compound lens is a sum of the focal length of each of the single lenses of the compound lens:

$$\frac{1}{f} = \sum_{i=1}^{2} \frac{1}{f_i}, \text{ and}$$
$$= \frac{1}{f_1} + \frac{1}{f_2}$$

the temperature characteristic of the compound focal length, wherein fs represents the compound focal length of the compound lens at a reference temperature, is:

$$\frac{df}{dT} = f_s^2 \cdot \sum_{i=1}^{k} \left[ \alpha_i \cdot (n_i - 1) - \frac{dn_i}{dT} \right] \cdot \left( \frac{1}{r_{ia}} - \frac{1}{r_{ib}} \right),$$

and wherein a number of the single lenses comprises three or more.

9. The spectroscope of claim 1, wherein the spectroscope comprises a multipath spectroscope having at least two paths.

10. A spectroscope comprising:
a wavelength dispersion element which performs wavelength dispersion of measured light with;
a light reception element which receives the light;
a compound lens including a plurality of lenses, which converts the incident measured light into parallel light and emits the parallel light to the wavelength dispersion element, and which gathers the measured light subjected to the wavelength dispersion in the wavelength dispersion element and causes the light reception element to receive the light; and
a base which fixes the wavelength dispersion element and the compound lens,
wherein the linear expansion coefficient of the compound focal length of said compound lens, and the linear expansion coefficient of a material forming said base are substantially equal.

11. The spectroscope as claimed in claim 10 wherein for said compound lens, the linear expansion coefficient of the compound focal length of the compound lens is adjusted according to the curvature radius of each of the plurality of lenses, the refractive index of a lens material of each of the plurality of lenses, the temperature change ratio of the refractive index of the lens material, or the linear expansion coefficient of the lens material.

12. The spectroscope as claimed in claim 10 further comprising:
a wavelength band limiting member which limits the wavelength band of diffracted light from the wavelength dispersion element, the wavelength band limiting member being provided at the focal position of said compound lens.

13. The spectroscope as claimed in claim 10 wherein the light reception element has a plurality of photodiodes arranged in a wavelength dispersion direction with a light reception face provided at the focal position of said compound lens.

* * * * *